Sept. 17, 1963 J. P. C. M. VAN BROECKHUYSEN ET AL 3,103,814
PROCESS AND APPARATUS FOR PRODUCING AN AUXILIARY
FLUID FLOW WHICH IS PROPORTIONAL
TO A MAIN FLUID FLOW
Filed Feb. 27, 1961                              3 Sheets-Sheet 1
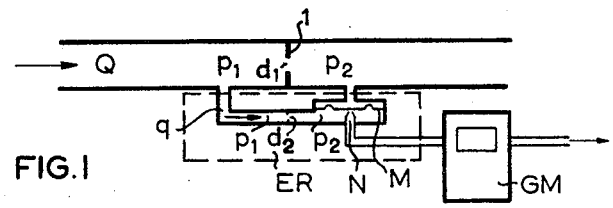
FIG.1
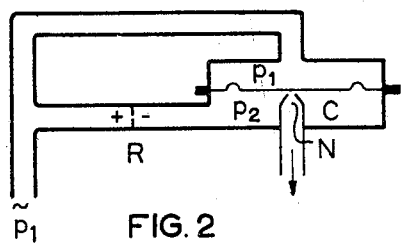
FIG. 2
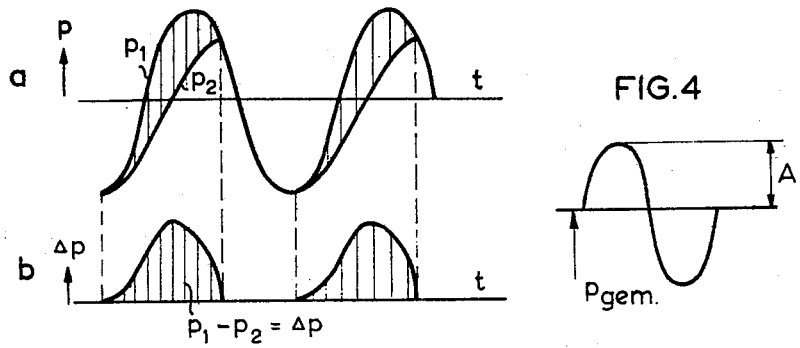
FIG. 3
FIG. 4
Inventors
Johannes P. C. M. Van Broeckhuysen
Johannes J. H. Buys
By Cushman, Darby & Cushman
Attorneys

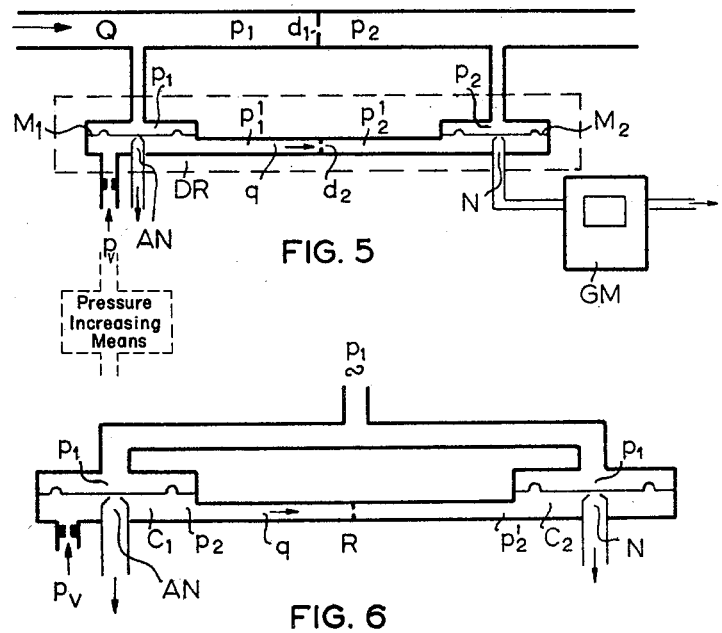
FIG. 5
FIG. 6
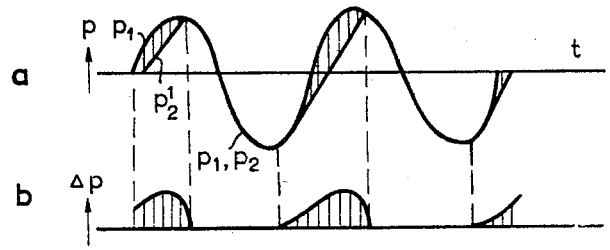
FIG. 7

United States Patent Office 3,103,814
Patented Sept. 17, 1963

3,103,814
PROCESS AND APPARATUS FOR PRODUCING AN AUXILIARY FLUID FLOW WHICH IS PROPORTIONAL TO A MAIN FLUID FLOW
Johannes P. C. M. van Broeckhuysen, Geleen, and Johannes J. H. Buys, Sittard, Netherlands, assignors to Stamicarbon N.V., Heerlen, Netherlands
Filed Feb. 27, 1961, Ser. No. 92,055
Claims priority, application Netherlands Feb. 29, 1960
15 Claims. (Cl. 73—202)

The present invention is concerned with certain improved procedures and apparatus for producing an auxiliary gas or liquid flow which is proportional to a main flow of gas or liquid even though the main flow is subject to strong pulsations.

According to the invention, use is made of a single or double pressure relay, as hereinafter described, into which the auxiliary fluid flow is passed. The single pressure relay includes a diaphragm which is open on one side to the main flow, and on the other side to a chamber into which the auxiliary flow is passed. Included in this chamber is an appropriate outlet which is operatively associated with the diaphragm for discharging the auxiliary flow from the chamber. The double pressure relay is generally similar to this arrangement except that it includes two diaphragms and two chambers for the auxiliary flow.

A process of the type broadly mentioned above is referred to in the "Conference Preprint No. 109–59," published by the Instrument Society of America on the occasion of the 14th Annual Instrument-Automation Conference and Exhibit, Chicago, Illinois, September 21–25, 1959. This publication deals with the measuring of pulsating gas flows but up to the present invention, there has not been found any process for measuring pulsating gas flow which gives satisfactory results under all conditions. This is confirmed by the conclusions at page 8 of said publication wherein it is stated that:

"The authors feel, however, so much work, theoretical and experimental, especially studies on the law of similarity which have yet remained untouched, should be done in order to establish the very best method of measuring a pulsating gas flow."

The principal object of the present invention is to provide improvements in the above-mentioned procedure whereby highly accurate and satisfactory results can be obtained with the auxiliary gas or liquid under all types of operating conditions and even though the main flow of gas or liquid is subject to very high pulsation. Another object of the invention is to provide a novel and highly advantageous double pressure-relay which is useful in carrying out the present process. Other objects will also be hereinafter apparent.

The invention herein is based on the discovery that there is a critical relationship between the minimum quantity of the auxiliary flow passing through the chamber, the capacity of the chamber preceding discharge of the auxiliary flow from the pressure relay and the intensity of the pulsations. Thus, it has been found that, for the chamber preceding discharge of the auxiliary flow, the following equation should be satisfied to obtain the desired results:

$$q_{min} = C \left( \frac{dp}{dt} \right)_{max}$$

wherein: $q_{min}$ represents the minimum quantity of auxiliary flow passing through the chamber per unit time, for example, in terms of cm.³ (N.T.P.)/minute;

C represents the capacity of said chamber given, for example, in terms of $$\frac{cm.^3 \ (N.T.P.)}{kg./cm.^2}$$

same being directly proportional to the geometrical capacity in cm.³, which is not effected by the pressure; and $$\left( \frac{dp}{dt} \right)_{max}$$

represents the maximum pressure rise in terms of $$\frac{kg./cm.^2}{min.}$$

The above relationship gives an auxiliary flow which is very accurately proportional to the main flow even though the latter may have strong pulsations. Accordingly, it is possible to very accurately measure and automatically control a main flow of liquid or gas using an auxiliary flow in the manner indicated.

Typically, the present process may be used for maintaining a constant main flow or for controlling a compressor, etc. Thus, tests have shown that even in measurements between the second and third stages of a compressor, where very strong rate pulsations occur at widely divergent pressures and quantities, measuring results with deviations of less than 1% can be obtained using the present process.

If desired, the auxiliary flow may comprise a foreign fluid, i.e. a fluid different from the main fluid. The advantage of this is that no fluid is lost from the main flow, and, in addition, there is no danger of fouling of the pressure relay or relays by foul fluid from the main flow. On the other hand, use of a foreign fluid presents the disadvantage that accurate measuring is difficult if the fluid of the main flow varies in composition, temperature, etc., as these properties affect the result of the measurement. Hence it is preferred to use a partial flow of the main flow as auxiliary flow, and to free this partial flow from dust, for instance by filtering, before passing it into the pressure-relay arrangement. To keep the loss of fluid from the main flow low, and also to keep the measuring apparatus small, the partial flow is preferably made as small as possible. After the desired measurement, the fluid of the partial flow is allowed to flow freely out of the system.

It is recommended that the invention be used for the continuous sampling of a gas or liquid flow. In this event, the sample is formed by an auxiliary flow which forms part of the main flow.

If a double pressure-relay system is used, the auxiliary flow is supplied to the first chamber of the relay under a pressure which is slightly higher than the pressure of the main flow.

The method of taking samples mentioned above is particularly attractive for the analysis of liquids. Hitherto, for example, a drop sampler has been used for this purpose. Such a sampler, however, also delivers liquid when the main flow is shut off, so that when the composition of the liquid varies, a sample is taken which cannot be representative of the main flow. The present invention, of course, obviates this prior art problem.

The higher pressure to be used with a double pressure-relay is necessary to obtain the desired partial flow. To this end a pressure pump may be used if the partial flow is branched off before the measuring point of the main flow. If a gaseous fluid which is compressed behind the measuring point is present, the partial flow may also be branched off beyond the compressor, and, if desired, may be supplied to the first chamber via a throttling valve.

Another very suitable application of the invention is a process for determining the number of calories represented by a gas flow. In this case, the number of calories of a partial flow obtained according to the process of the invention is determined by continuous combustion and subsequently multiplied by a fixed number (number of calories of the main flow divided by that of the partial flow). Thus, the amount of energy delivered, for instance, in the form of coke oven gas, can be accurately measured in a simple manner, even when large pulsations occur in the conduit.

From the above-mentioned formula, it will be apparent that the partial flow cannot be indefinitely small. The formula also shows that it is desirable to make the capacity of the relay as small as possible. Accordingly, another aspect of the present invention relates to a constructional improvement, in the case of a double pressure-relay provided with two diaphragms whereby the relay is built as compactly as possible to give a minimum capacity. This double relay is characterized by the following: the chamber on one side of one diaphragm is connected to the main conduit at or near the inlet side of a measuring orifice plate positioned in the conduit; the chamber on the other side of the same diaphragm is connected to a source for the auxiliary fluid which may be taken from the main fluid or otherwise; the pressure in the last-mentioned chamber is controlled by the diaphragm, the chamber being connected by means of a second measuring orifice plate to a third chamber on one side of the other diaphragm; the third chamber being connected to a measuring instrument and the pressure therein being controlled by the diaphragm; and the other chamber on the other side of this second diaphragm being connected to the main flow conduit at or near the outlet side of the first-mentioned measuring orifice.

The improvement in the present relay includes the feature that the chambers for the auxiliary flow are positioned between the two diaphragms and the connecting conduit which includes the second measuring orifice plate for the auxiliary flow is straight. Thus, when compared with the pressure-relay described in the aforementioned publication, the chambers separated by diaphragms have been exchanged in the present relay and the by-pass conduit containing the second orifice plate is replaced by a straight channel between the diaphragms.

The invention is illustrated by the accompanying drawings wherein:

FIGURES 1 and 5 are diagrammatic views of an apparatus provided with a single and a double pressure-relay, respectively;

FIGURES 2 and 6 are auxiliary diagrams for explaining the so-called valve-effect;

FIGURES 3, 4 and 7 are pressure plots; and

Figure 8:
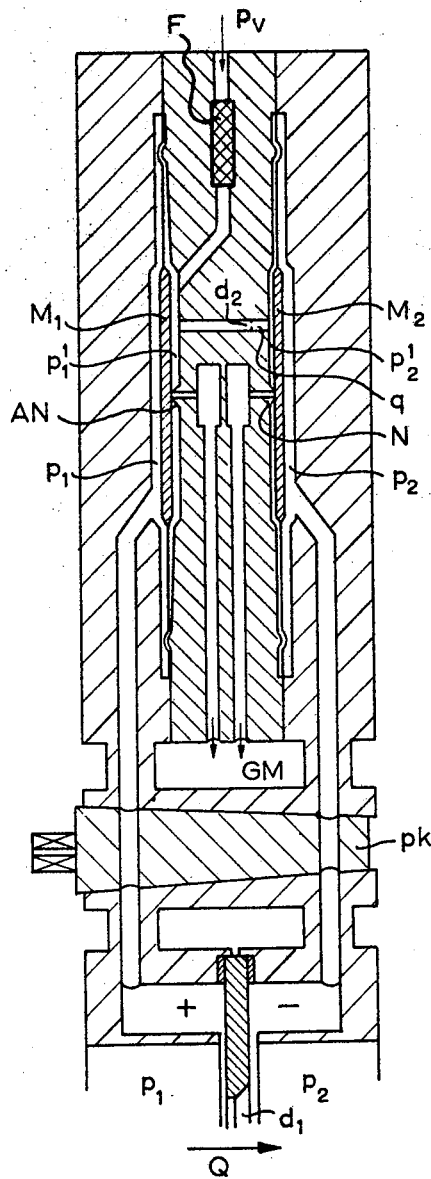
FIGURE 8 is a section of the improved double pressure-relay according to the invention.

Referring to FIGURE 1, the reference letter Q indicates a main fluid flow while $q$ stands for the partial flow. Placed in the main flow is an orifice plate 1 provided with an aperture $d_1$. The partial flow $q$ is admitted to a pressure-relay ER shown generally by the broken lines and including an orifice plate provided with an aperture $d_2$. The relay also includes a diaphragm M and under this there debouches a nozzle N, the latter being connected to a gasmeter GM. It will be appreciated that the diaphragm M and outlet or nozzle N are operatively associated so that the diaphragm regulates discharge of fluid through the nozzle.

The diaphragm M separates the partial flow $q$ from the main flow behind the orifice plate 1. Additionally, the diaphragm M controls the partial flow in such a way that the pressure $p_2$ is equal on both sides of the diaphragm. As the gas of the partial flow $q$ is the same or equal to that of the main flow Q, $Q=cq$, where $c$ is a constant. This method gives a measurement which is independent of pressure and temperature.

It has been found, however, that under pulsating conditions, the magnitude of the pulsation can affect the constant $c$ to a considerable degree, so that the partial flow is not a known measure of the main flow under all circumstances. Hitherto, it has not been possible to solve this problem. However, the present invention obviates this problem and the difficulties caused thereby in the manner described below.

According to the present invention, it has been discovered that a phenomenon (which is hereinafter called the "valve effect") is responsible for the measuring errors in partial flow measurements. This valve effect, which is illustrated by means of FIGURES 2, 3, 6 and 7, is caused by a deformation of the pressure variations, the deformation being chiefly determined by the resistance of the orifice plate for the auxiliary flow and the capacity of the diaphragm-holder or chamber. Thus, if the positive and negative sides of the partial-flow section in a test-assembly according to FIGURE 2 are connected with each other and a pulsating pressure $p_1$ is applied to the whole assembly; it has been found that the following will occur:

(a) A decrease in $p_1$ will immediately be followed by a decrease in pressure $p_2$, due to the fact that this pressure is vented through the nozzle N;

(b) An increase in $p_1$ will not immediately be followed by an increase in pressure $p_2$, because the capacity C has to be filled up through the orifice plate R (FIGURE 3a). In other words, there is a definite time lag before pressure $p_2$ increases to correspond with the increase in $p_1$;

(c) Filling-up of the chamber C will result in the formation of an undesirable partial flow, since $p_1-p_2=\Delta p$ (FIGURE 3b).

The undesirable partial flow mentioned in the preceding paragraph is not formed if the difference in pressure $p_1-p_2$ across the orifice plate 1 in the main flow (FIGURE 1) is at least equal to $\Delta p$ according to FIGURE 3b. An increase of $p_2$ over the diaphragm M (FIGURE 1) can then immediately be followed by an increase of $p_2$ under the diaphragm, because the chamber or capacity C is filled up with sufficient rapidity by the partial flow when the vent nozzle N is closed. From this it can be concluded that for a certain rate of pressure increase and a certain capacity for the chamber C the partial flow $q$ has to exceed a certain value in order to rule out the valve effect. It will be appreciated that the capacity for the chamber C is considered to be all of the area or volume under the diaphragm from the orifice plate R to the outlet.

If the pressure changes sinusoidally, $$p=p_{\text{mean}}+A \sin \omega t$$

The alternating flow component is $A \sin \omega t$.

$$\frac{dp}{dt}=A\omega \cos \omega t=A2\pi f \cos \omega t$$

$$\left(\frac{dp}{dt}\right)_{\text{max}}=(A)2\pi(f)$$

In connection with the foregoing, it might be helpful to note the following definitions:

A stands for the maximum amplitude of the pulses;
$t$ stands for the time from the zero point of a pulse in minutes;
$f$ stands for the number of cycles of the pulses per minute and
N.T.P. stands for a temperature of 15° C. and a pressure of 760 mm. Hg If C is the capacity to be filled up by the partial flow $q_{\min}$, then $$q_{\min}=C\frac{dp}{dt}$$

or, for a sinusoidal variation in pressure, $$q_{min} = 2\pi f(C)(A)$$

If C is expressed in $$\frac{cm.^3 \text{ (N.T.P.)}}{kg./cm.^2}$$

$$\frac{dp}{dt}$$

in $$\frac{kg./cm.^2}{min.}$$

and $f$ in cycles/min., then $$q_{min} = 0.377(C)(A)f1 \text{(N.T.P.)/min.}$$

In the case of non-sinusoidal pulsations the maximum $$\frac{dp}{dt}$$

must first be found (measurement of the slope in the pressure diagram) before $q_{min}$ can be calculated.

FIGURE 4 represents a plot of pressure against time wherein:

$P_{gem}$ stands for the pressure without pulsations; and
A stands for the maximum amplitude of a pulse.

A double pressure relay (DR) according to FIGURE 5 may be used to prevent fouling of the small measuring orifice $d_2$. In this arrangement, the flow is admitted after having been first purified. The pressure $p_v$ of the auxiliary flow must under all circumstances be higher than the pressure $p_1$. Consequently, if the auxiliary flow is part of the main flow, special pressure-increasing means must be applied to this end, if necessary. The auxiliary flow may be heated to the temperature of the main flow by means of a heat exchanger. Under the diaphragm $M_1$, a vent nozzle AN is fitted, same operating in the general manner of nozzle N. FIGURES 6 and 7 are used to determine the valve affect for a double pressure-relay according to FIGURE 5. If the two diaphragm housings in a test assembly according to FIGURE 6 are connected and a pulsating pressure $p_1$ is applied to this connecting pipe, the following will occur:

(a) An increase of $p_1$ will immediately be followed by an increase of the pressure $p_2$, because the vent nozzle AN will be closed to a greater extent, whereas the pressure $p'_2$ will not follow immediately, because the capacity $C_2$ has to be filled up across the resistance R of the measuring orifice;

(b) A decrease of $p_1$ will immediately be followed by a decrease of the pressure $p'_2$ because this pressure is vented through the nozzle N, while $p_2$ will also follow immediately because the capacity $C_1$ can be emptied through the vent nozzle AN;

(c) An udesirable partial flow will be formed due to the pressurizing of $C_2$ (FIGURES 7a and b).

If the partial flow is large enough, an increase of $p_1$ can be immediately followed by an increase of pressure $p'_2$ because the partial flow $q$ fills up the capacity $C_2$ with sufficient rapidity.

If an instrument permitting the widest possible application is to be designed, it is consequently necessary to make the capacity $C_2$ as small as possible constructionally so as to keep $q_{min}$ as small as possible at a given value of $$\frac{dp}{dt}$$

A double pressure-relay which fulfills the condition noted in the preceding paragraph is represented in FIGURE 8 and comprises a further feature of the invention. Initially, it should be noted that the reference letters used in FIGURE 8 correspond to those of FIGURE 5. Additionally, F indicates a filter and $pk$ denotes a plug valve. Instead of a plug valve, a flat slide valve may also be used with good success.

All conduits are so constructed as to have the smallest possible volume at the lowest resistance, so that the pulsations are transmitted to the diaphragms undamped. For this reason, the relay is fitted immediately over the orifice plate of the main conduit. The chambers are also as small as possible. In the designs of the prior art the connecting pipe in which the orifice plate $d_2$ is fitted connects the outer chambers, so that a by-pass conduit promoting the valve effect is supplied.

Hereinafter, a discussion is given on the application of the improved pressure-relay in a manner according to the present invention. The capacity is 4 cm.³ (N.T.P.)/kg./cm.². The partial flow $q_{min.} = 1$ m.³ (N.T.P.)/h.
$q_{min.} = 0.377\ (C)(A)f1$(N.T.P.)/min.

$$Af = \frac{q_{min}}{0.377C} = \frac{1000}{0.377(4)} = 663 \text{ kg./cm.}^2$$

For the compressor concerned $f = 120$ cycles per minute. The maximum allowable force of pulsation $$A = \frac{663}{120} = 5.53 \text{ kg./cm.}^2$$

Using this measuring instrument experiments have been made between the second and third stages of the above-mentioned compressor, the force of the pressure pulsation being smaller than the maximum force admissible. The results of six measurements carried out at various pressures and with various volumes are as follows:

|   | Q according to reference measurement, m.³ (N.T.P.)/h. | Q according to partial flow measurement, m.³ (N.T.P.)/h. | Difference, percent |
|---|---|---|---|
| 1 | 969 | 964 | −0.5 |
| 2 | 967 | 963 | −0.4 |
| 3 | 656 | 654 | −0.3 |
| 4 | 654 | 657 | +0.5 |
| 5 | 644 | 647 | +0.5 |
| 6 | 644 | 644 | 0 |

Experiments with this instrument have also been made behind the last stage of the same compressor. The results of six measurements carried out at various pressures and with various volumes are as follows:

|   | Q according to reference measurement | Q according to partial flow measurement | Difference |
|---|---|---|---|
| 1 | 993 | 984 | −0.9 |
| 2 | 992 | 983 | −0.9 |
| 3 | 987 | 978 | −0.9 |
| 4 | 987 | 976 | −1.1 |
| 5 | 991 | 985 | −1.1 |
| 6 | 990 | 982 | −0.8 |

In connection with the above-mentioned tests it is important to note that there is a distinction between rate pulsations and pressure pulsations. These two different types of pulsations can occur either separately or in combination. In the case of a pulsating gas flow, the mass transport at a given point in the conduit varies in dependence on time. Between two stages of a compressor rate pulsations occur. The pressure in the conduit is almost constant here. An expansion valve fitted behind the last stage of the compressor in a test assembly, however, allows the pulsating mass-flow to pass at a constant rate. It can be imagined that the pulsating gas flow is compressed in the conduit space owing to a high resistance. Consequently, the pressure will in this section of the conduit rise to a high degree. As a result the flow Q can increase across the resistance. Consequently, a small variation in the rate of flow together with a considerable variation in pressure may be expected immediately before the valve. It is the rate pulsations that can cause serious measuring errors during a normal measurement by means of an orifice plate. For instance, in measuring a gas flow with the aid of an orifice plate during a test in which the above-mentioned expansion valve was fitted behind a compressor, a measuring error of +3% was found, whereas a measurement of the same gas flow between two stages of the compressor showed an error of +70%.

From what has been said above it can be concluded that although previous measuring devices could give good results under certain pulsating conditions, they cannot be expected to do so under other conditions. On the other hand, if the method according to the present invention is used, good measuring results can be obtained under all conditions.

As will be apparent from the foregoing, the application of the invention is not restricted to the use of gases for measuring and controlling purposes. The invention is very attractive for analysing purposes in general and therefore, may also be used for the analysis of liquids, as, for example, a continuous sampler which is very simple and reliable. This sampler can be used not only for determining the composition of the fluid, but also for determining other values, for example, calorific value. As a result, the invention is of particular importance for the distribution of coke oven gas.

Modifications may be made in the invention described herein without deviating from the scope thereof as set forth in the attached claims herein.

What is claimed is:

1. A method of obtaining an auxiliary fluid flow which is proportional to a main fluid flow even during strong pulsations in the latter utilizing a pressure relay, comprising the steps of passing the main fluid flow through an apertured orifice plate, passing at least a minimum quantity of auxiliary fluid flow into a chamber communicating with a control device that communicates with the main fluid flow passed through said orifice plate, said control device controlling said auxiliary fluid flow so as to maintain said auxiliary flow proportional to said main flow, said minimum quantity of auxiliary fluid flow passed into said chamber being expressed by the equation:

$$q_{min} = C\left(\frac{dp}{dt}\right)_{max}$$

wherein: $q_{min}$ stands for the minimum quantity of auxiliary flow passing through the chamber per unit time expressed in terms of cm.³ (N.T.P.)/minute; C stands for the capacity of the chamber in cm.³ (N.T.P.)/kg./cm.², which is directly proportional to the geometrical capacity in cm.³, which is not affected by the fluid pressure; and $$\left(\frac{dp}{dt}\right)_{max}$$

stands for the maximum pressure rise in $$\frac{kg./cm.^2}{min.}$$

2. A process for controlling and/or measuring a main fluid flow which comprises utilizing the auxiliary flow obtained according to claim 1 for such control and/or measurement.

3. A process according to claim 2 wherein said auxiliary flow is discharged from said chamber and measured for the purpose of measuring said main flow.

4. A process according to claim 1 wherein said auxiliary flow is the same fluid as said main flow.

5. A process according to claim 1 wherein a double pressure-relay, including two diaphragms and an auxiliary flow chamber for each, is utilized, said auxiliary flow being fed to the first chamber at a pressure slightly higher than the pressure in the main flow associated therewith.

6. A process for the continuous sampling of a main fluid flow which comprises continuously obtaining an auxiliary fluid flow from the main flow according to the process of claim 1.

7. The process of claim 6 wherein the auxiliary fluid flow which is obtained is discharged from said chamber and analysed.

8. A process for determining the number of calories represented by a main gas flow which comprises preparing an auxiliary flow of said gas by the process of claim 1, determining the number of calories in said auxiliary flow by continuous combustion of said auxiliary flow and then multiplying the resulting value by a constant based on the ratio of main flow to auxiliary flow.

9. A double pressure-relay for use in obtaining an auxiliary fluid flow proportional to a main fluid flow flowing through a measuring orifice plate positioned in a main flow conduit even during strong pulsations of the main fluid flow, said relay including a first diaphragm and a second diaphragm, an auxiliary flow chamber and a main flow chamber on opposite sides of said first diaphragm, means for connecting the main flow chamber of said first diaphragm to the main conduit adjacent the inlet side of said orifice plate, means for connecting the auxiliary flow chamber to a source for said auxiliary flow, means in said auxiliary flow chamber cooperative with said first diaphragm for controlling the pressure in said auxiliary flow chamber; another pair of main flow and auxiliary flow chambers located on opposite sides of the second diaphragm, a straight conduit including a second measuring orifice plate connecting the auxiliary flow chamber of said first diaphragm with the auxiliary flow chamber of said second diaphragm; measuring means connected to the auxiliary flow chamber of said second diaphragm, means associated with said second diaphragm for controlling the pressure in said last-mentioned auxiliary flow chamber, and means for connecting the main flow chamber on the other side of said second diaphragm to the outlet of the first-mentioned measuring orifice plate, said two auxiliary flow chambers being positioned between said two diaphragms whereby said relay provides a minimum capacity and the relationship expressed by the following equation can be satisfied:

$$q_{min} = C\left(\frac{dp}{dt}\right)_{max}$$

wherein: $q_{min}$ stands for the minimum quantity of auxiliary flow passing through the auxiliary flow chamber of said second diaphragm in terms of cm.³ (N.T.P.)/minute; C stands for the capacity of the auxiliary flow chamber of said second diaphragm in cm.³ (N.T.P.)/kg./cm.², which is directly proportional to the geometrical capacity in cm.³, which is not affected by the fluid pressure; and $$\left(\frac{dp}{dt}\right)_{max}$$

stands for the maximum pressure rise in $$\frac{kg./cm.^2}{min.}$$

10. A double pressure-relay for use in obtaining an auxiliary fluid flow which is proportional to a main fluid flow flowing through a measuring orifice plate positioned in a main flow conduit, said relay comprising a casing for positioning adjacent said orifice plate and including: a first and second diaphragm within said casing, said diaphragms being positioned in parallel planes, an auxiliary flow chamber and a main flow chamber positioned on opposite sides of said first diaphragm, conduit means in said casing for connecting said main flow chamber to the inlet side of said orifice plate, conduit means within said casing for connecting the auxiliary flow chamber to a source of auxiliary fluid flow, a vent nozzle operatively associated with said first diaphragm for controlling the pressure in said auxiliary flow chamber by regulating the amounts of fluid discharged therefrom; another pair of main flow and auxiliary flow chambers located on opposite sides of said second diaphragm, means connecting the main flow chamber of said second diaphragm to the outlet of said measuring orifice plate, straight conduit means extending in a direction transverse to the planes of said diaphragms and including a second measuring orifice plate, said conduit means connecting the auxiliary flow chamber of said first diaphragm with the auxiliary flow chamber of said second diaphragm, a vent nozzle in the auxiliary flow chamber of said second diaphragm operatively associated with said last-mentioned diaphragm for controlling the pressure in its auxiliary flow chamber, and means for connecting said vent nozzle with measuring means whereby said relay provides a minimum capacity and the relationship expressed by the following equation can be satisfied:

$$q_{min} = C\left(\frac{dp}{dt}\right)_{max}$$

wherein: $q_{min}$ stands for the minimum quantity of auxiliary flow passing through the auxiliary flow chamber of said second diaphragm in terms of cm.³ (N.T.P.)/minute; C stands for the capacity of the auxiliary flow chamber of said second diaphragm in cm.³ (N.T.P.)/kg./cm.², which is directly proportional to the geometrical capacity in cm.³, which is not affected by the fluid pressure; and $$\left(\frac{dp}{dt}\right)_{max}$$

stands for the maximum pressure rise in $$\frac{kg./cm.^2}{min.}$$

11. Apparatus for obtaining an auxiliary fluid flow which is proportional to a main fluid flow even though the latter is subject to strong pulsation, said apparatus including, for operative association with a measuring orifice plate positioned within a main flow conduit, a pressure-relay including a diaphragm, said diaphragm communicating on one side with the main flow conduit, an auxiliary flow chamber communicating with the other side of said diaphragm, means for supplying auxiliary fluid flow to said chamber including a conduit with a second measuring orifice opening into said chamber and means for discharging fluid from said chamber, said chamber and said second measuring orifice being such that the following relationship is satisfied:

$$q_{min} = C\left(\frac{dp}{dt}\right)_{max}$$

wherein: $q_{min}$ stands for the minimum quantity of auxiliary flow passing through said chamber in terms of cm.³(N.T.P.)/minute; C stands for the capacity of said chamber in cm.³(N.T.P.)/kg./cm.² and $$\left(\frac{dp}{dt}\right)_{max}$$

stands for the maximum pressure rise in $$\frac{kg./cm.^2}{min.}$$

12. An apparatus according to claim 11 wherein the pressure-relay is a single pressure-relay.

13. An apparatus according to claim 11 wherein said relay is a double pressure-relay including a pair of diaphragms, each of said diaphragms including an auxiliary flow chamber, so as to provide a first and second auxiliary flow chamber, means for continuously supplying, as the auxiliary flow, a sample of the main fluid flow into the first of said auxiliary chambers, conduit means discharging said auxiliary flow chamber into the second chamber and means for discharging said auxiliary flow from said second chamber.

14. An apparatus according to claim 13 including means for increasing the pressure on said sample before it is supplied to said first auxiliary flow chamber.

15. A sampling apparatus wherein the sample is formed by an auxiliary fluid flow which forms a part of the main fluid flow flowing through a measuring orifice plate positioned in a main flow conduit, said auxiliary fluid flow being proportional to, and representative of the main fluid flow even during strong pulsations of the latter, said apparatus including a double pressure relay, said relay including a first diaphragm and a second diaphragm, an auxiliary flow chamber and a main flow chamber on opposite sides of said first diaphragm, means for connecting the main flow chamber of said first diaphragm to the main conduit adjacent the inlet side of said orifice plate, means for continuously supplying, as the auxiliary flow, a sample of the main fluid flow into the auxiliary flow chamber, means in said auxiliary flow chamber cooperative with said first diaphragm for controlling the pressure in said auxiliary flow chamber, another pair of main flow and auxiliary flow chambers located on opposite sides of the second diaphragm, a straight conduit including a second measuring orifice plate connecting the auxiliary flow chamber of said first diaphragm with the auxiliary flow chamber of said second diaphragm, sample measuring means connected to the auxiliary flow chamber of said second diaphragm, means associated with said second diaphragm for controlling the pressure in said last-mentioned auxiliary flow chamber, and means for connecting the main flow chamber on the other side of said second diaphragm to the outlet of the first-mentioned measuring orifice plate, said two auxiliary flow chambers being positioned between said two diaphragms whereby said relay provides a minimum capacity and the relationship expressed by the following equation can be satisfied:

$$q_{min} = C\left(\frac{dp}{dt}\right)_{max}$$

wherein: $q_{min}$ stands for the minimum quantity of auxiliary flow passing through the auxiliary flow chamber of said second diaphragm in terms of cm.³ (N.T.P.)/minute; C stands for the capacity of the auxiliary flow chamber of said second diaphragm in cm.³ (N.T.P.)/kg./cm.², which is directly proportional to the geometrical capacity in cm.³, which is not affected by the fluid pressure; and $$\left(\frac{dp}{dt}\right)_{max}$$

stands for the maximum pressure rise in $$\frac{kg./cm.^2}{min.}$$

References Cited in the file of this patent

UNITED STATES PATENTS 1,189,300    Smith _____ July 4, 1916

FOREIGN PATENTS 783,174    Great Britain _____ Sept. 18, 1957

OTHER REFERENCES

German application, 1,041,268, Oct. 16, 1958.